(12) United States Patent
Choi et al.

(10) Patent No.: US 9,708,511 B2
(45) Date of Patent: Jul. 18, 2017

(54) RUBBER-BASED ADHESIVE COMPOSITION HAVING EXCELLENT DURABILITY

(71) Applicant: LG Chem, Ltd., Seoul (KR)

(72) Inventors: Tae-Yi Choi, Gunpo-si (KR);
Eun-Kyung Park, Seoul (KR);
Ju-Hyeon Paeng, Seoul (KR);
Jang-Soon Kim, Seongnam-si (KR)

(73) Assignee: LG Chem, Ltd. (KR)

(*) Notice: Subject to any disclaimer, the term of this patent is extended or adjusted under 35 U.S.C. 154(b) by 0 days.

(21) Appl. No.: 14/912,602

(22) PCT Filed: Jul. 29, 2014

(86) PCT No.: PCT/KR2014/006939
§ 371 (c)(1),
(2) Date: Feb. 18, 2016

(87) PCT Pub. No.: WO2015/030375
PCT Pub. Date: Mar. 5, 2015

(65) Prior Publication Data
US 2016/0200948 A1    Jul. 14, 2016

(30) Foreign Application Priority Data
Aug. 27, 2013  (KR) .......................... 10-2013-0101664

(51) Int. Cl.
| C08J 3/28 | (2006.01) |
| C08F 2/46 | (2006.01) |
| C08G 61/04 | (2006.01) |
| C09J 11/08 | (2006.01) |
| C09J 119/00 | (2006.01) |
| C09J 109/00 | (2006.01) |
| C09J 123/22 | (2006.01) |
| C08L 9/00 | (2006.01) |

(52) U.S. Cl.
CPC ................ C09J 11/08 (2013.01); C08L 9/00 (2013.01); C09J 109/00 (2013.01); C09J 119/00 (2013.01); C09J 123/22 (2013.01)

(58) Field of Classification Search
CPC .................................. C09J 11/08; C09J 109/00
USPC .................. 522/158, 157, 150, 1, 161; 520/1
See application file for complete search history.

(56) References Cited

U.S. PATENT DOCUMENTS

| 5,232,531 | A | * | 8/1993 | Dammann ................ B32B 7/12 |
| | | | | 156/157 |
| 2008/0081868 | A1 | * | 4/2008 | Jiang .................... C09J 123/142 |
| | | | | 524/487 |
| 2011/0121356 | A1 | | 5/2011 | Krawinkel et al. |
| 2014/0023857 | A1 | * | 1/2014 | Igarashi ................. C09J 7/0214 |
| | | | | 428/336 |

FOREIGN PATENT DOCUMENTS

| CN | 1514861 A | 7/2004 |
| CN | 102083930 A | 6/2011 |
| JP | 04255779 A | 9/1992 |
| JP | 2006206454 A | 8/2006 |
| JP | 2006-206454 | * 10/2006 |
| JP | 2014019775 A | 2/2014 |
| KR | 100203554 B1 | 6/1999 |
| KR | 100968714 B1 | 7/2010 |
| KR | 1020110064714 A | 6/2011 |
| KR | 1020130033706 A | 4/2013 |

OTHER PUBLICATIONS

Akami et al, Oct. 10, 2006, JP 2006-206454 Machine Translation.*
Roff et al, Oct. 22, 2013, Butyl Rubber, Fibers, Films, Plastics, and Rubbers: A handbook of common polymers, p. 426.*
Escorez 5380 Technical Data sheet, 2008.*
International Search Report mailed Nov. 17, 2014 corresponding to International Application No. PCT/KR2014/006939.
Extended European Search Report dated May 27, 2016 in connection with the counterpart European Patent Application No. 14841138.2-1302.

* cited by examiner

*Primary Examiner* — Jessica E Whiteley
(74) *Attorney, Agent, or Firm* — Lerner, David, Littenberg, Krumholz & Mentlik, LLP

(57) ABSTRACT

The present invention relates to an adhesive composition including: a butyl-based rubber; and a tackifier having a softening point of 90° C. or more.

8 Claims, No Drawings

RUBBER-BASED ADHESIVE COMPOSITION HAVING EXCELLENT DURABILITY

TECHNICAL FIELD

The present invention relates to a rubber-based adhesive composition having excellent durability.

BACKGROUND ART

It is well known in the art that touch materials including a variety of packaged electronic devices, transparent conductive films, etc., require moisture prevention to maintain an excellent operation or a predetermined shelf-life. Further, in recent years, there is much interest in development of an adhesive composition for increasing durability of next generation devices such as an organic light emitting diode (OLED), a touch screen, etc.

However, although adhesives including an acrylic resin have been invented, a butyl-based rubber resin has not been used well as the adhesive composition since it has deteriorated durability according to multiple bonds. Korea Patent Laid-Open No. 10-2011-0064714 describes a butyl rubber composition having improved workability and formability; however, uses vulcanized butyl rubber and fails to disclose an action and an effect in which durability is excellent. Therefore, a butyl-based rubber resin obtained from the butyl rubber composition still has difficulty in being used as the adhesive composition to overcome the above problems.

DISCLOSURE

Technical Problem

It is an aspect of the present invention to provide an adhesive composition capable of controlling thermal stability by introducing a tackifier having a predetermined softening point.

It is another aspect of the present invention to provide an adhesive composition using a butyl-based rubber to have a low water vapor transmission rate and an increased chemical cross-linking density, thereby providing excellent durability.

Technical Solution

In accordance with one aspect of the present invention, an adhesive composition includes: a butyl-based rubber; and a tackifier having a softening point of 90° C. or more.

The butyl-based rubber may include at least one selected from the group consisting of a butyl rubber, a bromo-butyl rubber, and a chlorinated butyl rubber.

The butyl-based rubber may have a weight average molecular weight of about 50,000 to about 2,000,000.

The butyl-based rubber may be formed by polymerizing a mixture including about 1 mol % to about 5 mol % of isoprene relative to 100 mol % of the total monomer.

The butyl-based rubber may have an amount of about 50 wt % to about 90 wt % relative to total weight of the adhesive composition.

The tackifier may be a rosin-based resin, a rosin ester-based resin, a linear hydrocarbon-based resin or a cyclic olefin-based resin to which hydrogen is added. The tackifier may have a weight average molecular weight of about 500 to about 2,000.

The tackifier may have an amount of about 5 wt % to about 40 wt % relative to total weight of the adhesive composition.

The adhesive composition may further include: at least one selected from the group consisting of a UV curing agent, a UV stabilizer, a photoinitiator, a thermal initiator, an antioxidant, a filler and a plasticizer.

A water vapor transmission rate of the adhesive composition may be about 10 g/m$^2$·24 hr at a temperature of 38° C. and relative humidity of 90%.

Advantageous Effects

The adhesive composition according to the present invention may control thermal stability and have excellent durability and high reliability, such that bubbles do not occur even in high temperature and high humidity external environment.

The adhesive composition may be applied to a touch material or an electronic device to increase lifespan and durability of the next generation device such as a touch panel or an organic light emitting diode (OLED).

BEST MODE

Hereinafter, exemplary embodiments of the present invention will be described in detail. However, these exemplary embodiments are only provided by way of example, and the present invention is not limited to these exemplary embodiments. Therefore, the present invention will be defined only by the scope of the appended claims.

In an exemplary embodiment of the present invention, the present invention provides an adhesive composition including: a butyl-based rubber; and an adhesion promoter having a softening point of 90 C. or more.

In order for the adhesive composition to be applied to a next generation device such as a touch panel or an organic light emitting diode (OLED), a water vapor transmission rate needs to be decreased and chemical cross-linking density needs to be increased, such that durability needs to be excellent. Further, even when the adhesive composition is exposed for a long time in high temperature and high humidity external environment, bubbles should not occur. Here, when a base resin of the adhesive composition is highly entangled rubber, that is, when the adhesive composition includes a butyl-based rubber and a tackifier having a limited softening point as an additive, the degree of entanglement is increased and a coefficient of thermal expansion is decreased, such that the time at which bubbles occur by high temperature and high humidity external environment may be delayed.

The butyl-based rubber refers to an isobutylene-isoprene rubber, and refers to a copolymer containing a large amount of isobutylene and a small amount of isoprene. Due to the small amount of isoprene, a small amount of double bonds are present, such that a saturation degree is high and a moisture property is not present, whereby it is difficult to attach and detach the butyl-based rubber to other materials to be adhered, etc.

In order to overcome the disadvantage of the butyl-based rubber in that it is difficult to be attached and detached to the other materials to be adhered due to absence of moisture property, a tackifier may be introduced into the butyl-based rubber. The tackifier is an additive used to enhance an adhesive property of surfaces between rubber and plastic, for example, may be used to adhere compounded rubbers.

The adhesive composition may include the tackifier having a predetermined softening point. By limiting the softening point of the tackifier, properties of an adhesive based on the butyl-based rubber may be changed to increase chemical cross-linking density, thereby providing an adhesive composition having excellent durability.

Specifically, the tackifier may have a softening point of about 90° C. or more, specifically, about 95° C. to about 160° C. The softening point generally refers to a temperature at which a material starts to be deformed or softened by heating. The tackifier may start to be deformed or softened at about 90° C.

More specifically, when the softening point of the tackifier is maintained to be about 90° C. or more, the tackifier maintains a glassy state under a high temperature reliability condition, such that it is advantageous in that a thermal strain rate is reduced, and it is easy to secure high temperature reliability.

Meanwhile, when the softening point of the tackifier is less than about 90° C., there is a problem in which the tackifier starts to be softened at a high temperature, such that durability is deteriorated. For example, when the softening point of the tackifier is about 160° C. or more, an effect of the tackifier in which adhesion is increased may not be sufficient at room temperature.

The butyl-based rubber may include at least one selected from the group consisting of a butyl rubber (isobutylene-isoprene rubber (IIR)), a bromobutyl rubber (bromo isobutylene-isoprene rubber (BIIR)), and a chlorinated butyl rubber (chloro isobutylene-isoprene rubber (CIIR)).

The bromobutyl rubber and the chlorinated butyl rubber are halogenated butyl rubbers, and are produced by reacting a bromine atom and a chlorine atom, respectively, in a state in which butyl rubber is dissolved in light aliphatic hydrocarbon such as hexane. The bromobutyl rubber generally contains about 1.9 wt % to about 2.1 wt % of bromine, and the chlorinated butyl rubber generally contains about 1.1 wt % to about 1.3 wt % of chlorine. In addition, since the bromobutyl rubber and the chlorinated butyl rubber have significantly low halogen contents, they are not included in polar rubbers, and both of the bromobutyl rubber and the chlorinated butyl rubber have unique properties of unmodified butyl rubbers.

The butyl-based rubber may have a weight average molecular weight of about 50,000 to about 2,000,000. The weight average molecular weight refers to an average molecular weight obtained by averaging a molecular weight of component molecular species of a polymer compound having a molecular weight distribution by weight fraction. When the weight average molecular weight of the butyl-based rubber is less than about 50,000, a physical entanglement site is small, which may cause a problem in view of durability, and when the weight average molecular weight of the butyl-based rubber is more than about 200,000, viscosity of the adhesive composition is rapidly increased, which may cause a problem in view of compatibility of process conditions.

The butyl-based rubber may be formed by polymerizing a mixture including 1 mol % to 5 mol % of isoprene relative to 100 mol % of the total monomer. When isoprene has an amount beyond the above range relative to 100 mol % of the total monomer and is polymerized to form the butyl-based rubber, the butyl-based rubber includes a low double bond, such that durability of the adhesive composition at the time of curing may be decreased, and the butyl-based rubber containing high isoprene has difficulty in commercialization as the adhesive composition.

The butyl-based rubber may have an amount of about 50 wt % to about 90 wt % relative to total weight of the adhesive composition. When the amount of the butyl-based rubber is within the above-described range relative to total weight of the adhesive composition, a moisture barrier property of the butyl-based rubber is advantageously maintained, and durability may be secured by adding additives.

The tackifier may be a rosin-based resin, a rosin ester-based resin, a linear hydrocarbon-based resin or a cyclic olefin-based resin to which hydrogen is added. The rosin-based resin, the rosin ester-based resin, the linear hydrocarbon-based resin or the cyclic olefin-based resin to which hydrogen is added may be used as the tackifier to thereby provide the adhesive composition having increased compatibility with the butyl-based rubber and excellent durability. The rosin-based resin is not particularly limited, but for example, may be a rosin-based resin, a linear hydrocarbon-based resin or a cyclic olefin-based resin to which hydrogen is added that is usable as a tackifying resin.

Specifically, the rosin-based resin may be properly selected and used among known rosin-based resins of various rosin derivatives, in addition to unmodified rosins (crude rosins) such as gum rosin, wood rosin, tall oil rosin, etc., and modified rosins resulting from modification of these unmodified rosins by polymerization, disproportionation, hydrogenation, etc. (for example, polymerized rosins, stabilized rosins, disproportionated rosins, completely hydrogenated rosins, partially hydrogenated rosins, and other chemically modified rosins)

Examples of the rosin derivative may include rosin ester-based resins such as ester compounds of a rosin resulting from esterification of an unmodified rosin with an alcohol (unmodified rosin esters) and ester compounds of a modified rosin resulting from esterification of a modified rosin (for example, polymerized rosins, stabilized rosins, disproportionated rosins, completely hydrogenated rosins, and partially hydrogenated rosins) with an alcohol (for example, polymerized rosin esters, stabilized rosin esters, disproportionated rosin esters, completely hydrogenated rosin esters, and partially hydrogenated rosin esters); unsaturated fatty acid modified rosin-based resins resulting from modification of an unmodified rosin or a modified rosin (for example, polymerized rosins, stabilized rosins, disproportionated rosins, completely hydrogenated rosins, and partially hydrogenated rosins) with an unsaturated fatty acid; unsaturated fatty acid modified rosin ester-based resins resulting from modification of a rosin ester-based resin with an unsaturated fatty acid; rosin alcohol-based resins resulting from reduction of a carboxyl group in unmodified rosins, modified rosins (for example, polymerized rosins, stabilized rosins, disproportionated rosins, completely hydrogenated rosins, and partially hydrogenated rosins), unsaturated fatty acid modified rosin-based resins, and unsaturated fatty acid modified rosin ester-based resins; and metal salts of rosin-based resins such as unmodified rosins, modified rosins, and various rosin derivatives (in particular, rosin ester-based resins). The rosin-based resin may be used alone or in combination with two or more thereof.

Meanwhile, as alcohols used at the time of preparing the rosin ester-based resin, for example, polyols including divalent alcohols such ethylene glycol, diethylene glycol, propylene glycol, neopentyl glycol, trimethylene glycol, tetramethylene glycol, 1,3-butane diol, 1,6-hexane diol, etc.; trivalent alcohols such as glycerin, trimethylol ethane, trimethylol propane, triethylol ethane, etc.; tetravalent alcohols such as pentaerythritol, diglycerin, etc.; hexavalent alcohols such as dipentaerythritol, etc., are suitably used, but monovalent alcohols such as methanol, ethanol, etc., are used. Further, amino alcohols such as triethanolamine, tripropanolamine, triisopropanolamine, N-isobutyldiethanolamine, N-n-butyldiethanolamine, etc., may also be used as alcohols.

In addition, examples of the unsaturated fatty acid used in preparing the unsaturated fatty acid modified rosin-based resin or the unsaturated fatty acid modified rosin ester-based resin may include fumaric acid, maleic acid or an anhydride thereof, itaconic acid, citraconic acid or an anhydride thereof, α, β-unsaturated carboxylic acid such as acrylic acid, and methacrylic acid, etc.

The linear hydrocarbon-based resin may be a C5-based resin, a C9-based resin, a C5-based/C9-based mixed resin, a cyclopentadiene-based resin, a vinyl-substituted aromatic polymer resin, an olefin/vinyl substituted aromatic copolymer resin, a cyclopentadiene/vinyl-substituted aromatic copolymer resin, a hydrogenated product thereof, etc., but the present invention is not limited thereto.

Specific examples of the linear hydrocarbon-based resin may include Escorez (ExxonMobil Chemical), SUKOREZ or HIKOREZ (Kolon), I-MARV (Idemitsu), Neo polymer (Japan Petrochemicals), Arkon (Arakawa), High resin (Toho Chemical), YS Polyester or Crealon (Yasuhara), etc., but the present invention is not limited thereto.

The cyclic olefin-based resin in which hydrogen is added, does not necessarily include hydrogen, but an olefin-based resin obtained by polymerization depending on usages may be used as it is, wherein it is preferably determine whether or not hydrogen is added in consideration of a softening point of the tackifier, an effect in which adhesive strength is improved, heat tinting, etc.

A hydrogenation reaction for adding hydrogen to an olefinic unsaturated bond in the molecule may be performed by using the copolymer solution obtained after a ring-opening polymerization is completed, or may be performed by using the copolymer solution obtained by removing catalyst residue and unreacted monomers and then dissolving a ring-opened copolymer in an appropriate solvent.

The hydrogenation reaction is generally performed under a hydrogen pressure of 1.0 MPa to 15 MPa and a temperature of 50° C. to 200° C. A hydrogenation catalyst may be a heterogeneous catalyst in which a metal selected from palladium, platinum, platina, rhodium, iridium, ruthenium, nickel is supported in a carrier selected from silica, alumina, zeolite, diatomaceous earth, magnesia, carbon, calcium carbonate, or the like, or may be a homogeneous catalyst such as nickel octanoate/triethylaluminum, nickel naphthenate/triethylaluminum, cobalt octanoate/triethylaluminum, cobalt octanoate/n-butyllithium, bis-cyclopentadienyl titanium dichloride, diethyl aluminum chloride, palladium acetate/triethyl aluminum, tris(triphenylphosphine) rhodium, tris(triphenylphosphine) hydride-carbonyl-chloro-ruthenium, tris(tritolylphosphine) hydride-carbonyl-chloro-ruthenium, tris(trixylyl phosphine) hydride-carbonyl-chloro-ruthenium, tris(tricyclohexylphosphine) hydride-carbonyl-chloro-ruthenium, tris(triphenylphosphine) dihydro-carbonyl-ruthenium, bis(triphenyl phosphine) dichlororuthenium, or the like.

The hydrogenation catalyst is generally used in the range of 10 ppm to 1000 ppm by transition metal atom conversion with respect to a ring-opening copolymer. The cyclic olefin-based resin in which hydrogen is added has more excellent thermal stability as a hydrogenation rate of olefinic unsaturated bonds in the molecule is higher. As a result, thermal deterioration by heating, deterioration by oxygen, etc., in a desolventizing process, a pelletizing process, a product molding process, etc, may be inhibited.

The cyclic olefin-based resin in which hydrogen is added, may include known antioxidants, for example, phenol-based antioxidants or hydroquinone-based antioxidants such as 2,6-di-t-butyl, 4-methylphenol, 4,4'-thiobis-(6-t-butyl-3-methylphenol), 1,1'-bis(4-hydroxyphenyl)cyclohexane, 2,2'-methylenebis(4-ethyl-6-t-butylphenol), 2,5-di-t-butyl hydroquinone, pentaerythrityl-tetrakis[3-(3,5-di-t-butyl-4-hydroxyphenyl)propionate, etc.

Further, the cyclic olefin-based resin in which hydrogen is added, may be mixed with phosphorus-based antioxidants such as tris(4-methoxy-3,5-diphenyl)phosphite, tris(nonylphenyl)phosphite, tris(2,4-di-t-butylphenyl)phosphite, bis (2,6-di-t-butyl-4-methylphenyl)pentaerythritol diphosphite, bis(2,4-di-t-butylphenyl)pentaerythritol diphosphite, etc. to thereby improve oxidation stability.

The tackifier may have a weight average molecular weight of about 500 to about 2,000. When the weight average molecular weight of the tackifier is less than about 500, excellent adhesive strength may be provided, and when the weight average molecular weight of the tackifier is more than about 2,000, durability may be deteriorated due to molecules that do not participate in cross-linking.

The tackifier may have an amount of about 5 wt % to about 40 wt % relative to total weight of the adhesive composition. When the adhesive composition includes the tackifier having the above-described range relative to total weight of the adhesive composition, suitable adhesive strength may be provided, such that it is advantageous to implement durability to be capable of easily preparing a stable composition.

The adhesive composition may further include: at least one selected from the group consisting of a UV curing agent, a UV stabilizer, a photoinitiator, a thermal initiator, an antioxidant, a filler and a plasticizer, in addition to the butyl-based rubber and the tackifier. The additive may be suitably controlled within the range in which physical properties of the adhesive composition are not inhibited, and thus, may further include additives such as a pigment, a UV stabilizer, a dispersant, an anti-foaming agent, a thickener, a plasticizer, a tackifier, a silane coupling agent, a polish, etc.

The UV curing agent may include a UV-curable resin having good compatibility with the butyl-based rubber. For example, the UV curing agent may be selected from the group consisting of an acrylate resin, a methacrylate resin, an isocyanate resin, a melamine resin, a urethane resin, an epoxy resin, an acid anhydride, a polyamine resin, and a carboxy group-containing polymer. The UV curing agent preferably has an amount of about 5 wt % to about 20 wt % relative to total weight of the adhesive composition.

Examples of the photoinitiator may include at least one selected from the group consisting of benzoin methyl ether, 2,4,6-trimethylbenzoyl diphenylphosphine oxide, bis(2,4,6-trimethylbenzoyl)phenyl phosphine oxide, α,α-methoxy-α-hydroxyacetophenone, 2-benzoyl-2-(dimethylamino)-1-[4-(4 morphonyl)phenyl]-1-butanone and 2,2-dimethoxy-2-phenylacetophenone. The photoinitiator preferably has an amount of about 0.01 wt % to about 1 wt % relative to total weight of the adhesive composition.

The adhesive composition may include a thermal initiator, such that the adhesive composition may simultaneously include a photoinitiator and a thermal initiator to have a double curable constitution. For example, the thermal initiator may be activated by heat generated by decompositing the photoinitiator by irradiating ultraviolet rays, etc., to thereby participate in a curing reaction of the adhesive composition.

Here, the thermal initiator may include at least one selected from the group consisting of an azo-based compound, a peroxide-based compound, tert-butyl peracetate, peracetic acid, and potassium persulfate, and the thermal initiator preferably has an amount of about 0.01 wt % to about 10 wt % relative to total weight of the adhesive composition.

Preferably, the antioxidant may be a phenol-typed antioxidant, a phosphide-typed antioxidant, a thioether-typed antioxidant, or an amine-typed antioxidant.

Further, the filler may be used to improve physical properties or flexibility, and the filler may include fine particle quartz, molten silica, amorphous silica, talc, glass bead, graphite, carbon black, alumina, clay, mica, aluminum nitride and boron nitride, but the present invention is not limited thereto. Types and amounts for the filler that is suitable for the adhesive composition are included in specialized knowledge of a person skilled in the art.

In general, the filler may have an amount of about 1 wt % to about 10 wt % relative to total weight of the adhesive composition.

The plasticizer is not particularly limited, but for example, may include higher alcohols such as liquid paraffin, hydrogenated oil, hydrogenated castor oil, octyl dodecanol, etc., fatty acid esters such as squalane, squalene, castor oil, liquid rubber (polybutene), myristic acid isopropyl, etc. The plasticizer preferably has an amount of about 1 wt % to about 10 wt % relative to total weight of the adhesive composition.

A water vapor transmission rate of the adhesive composition may be about 10 $g/m^2 \cdot 24$ hr at a temperature of 38° C. and relative humidity of 90%. The water vapor transmission rate (WVTR) means an amount in which moisture is transmitted per unit area/unit time, such that the WVTR means amount/unit area/unit time in which moisture is transmitted under 38° C., 90% RH Qxxaazz condition. The WVTR may be about 10 $g/m^2 \cdot 24$ hr, specifically, about 5 $g/m^2 \cdot 24$ hr. In addition, as compared to the existing adhesive composition including the butyl-based rubber, the adhesive composition in which the a tackifier having a softening point of about 90° C. or more is introduced into the butyl-based rubber has tens or more improved WVTR to thereby have a low water vapor transmission rate and secure initial adhesive strength, peel strength, durability, etc., thereby having high functionality.

Accordingly, the adhesive composition includes the butyl-based rubber and the tackifier having a softening point of 90° C. or more to be capable of controlling thermal stability and having excellent durability and high reliability, such that bubbles do not occur even in high temperature and high humidity external environment. Further, the adhesive composition may be applied to a touch material or an electronic device to increase durability of the next generation device such as a touch panel or an organic light emitting diode (OLED).

In addition, the adhesive composition may be cured to form an adhesive layer, wherein the adhesive layer may have a thickness of about 10 μm to about 70 μm. When the thickness of the adhesive layer is maintained within the above-described range, sufficient adhesive strength may be secured, and processing conditions may be stably maintained.

Hereinafter, specific examples of the present invention will be provided. Meanwhile, Examples to be described below are just provided for specifically exemplifying or explaining the present invention, and accordingly, the present invention is not limited to the following Examples.

Examples and Comparative Examples

Examples and Comparative Examples of the adhesive composition were shown in Table 1 below.

TABLE 1

| | Major component | Photoinitiator | Curing Agent | Tackifier |
|---|---|---|---|---|
| Example 1 | Butyl-based rubber 50 wt % (Mn = 300,000, isoprene 1.3 mol %) | Irgacure 651 | HDDA | Rosin-based resin 5 wt % (softening point: 100° C.) (molecular weight: 500) |
| Example 2 | Butyl-based rubber 70 wt % (Mn = 500,000, isoprene 1.8 mol %) | Irgacure 651 | HDDA | linear hydrocarbon-based resin 10 wt % (softening point: 120° C.) (molecular weight: 700) |
| Example 3 | Butyl-based rubber 70 wt % (Mn = 500,000, isoprene 1.8 mol %) | Irgacure 651 | HDDA | linear hydrocarbon-based resin 20 wt % (softening point: 100° C.) (molecular weight: 800) |
| Example 4 | Butyl-based rubber 40 wt % (Mn = 300,000, isoprene 1.3 mol %) | Irgacure 651 | HDDA | Rosin-based resin 5 wt % (softening point: 100° C.) (molecular weight: 500) |
| Example 5 | Butyl-based rubber 100 wt % (Mn = 300,000, isoprene 1.3 mol %) | Irgacure 651 | HDDA | Rosin-based resin 5 wt % (softening point: 100° C.) (molecular weight: 500) |
| Example 6 | Butyl-based rubber 50 wt % (Mn = 300,000, isoprene 1.3 mol %) | Irgacure 651 | HDDA | Rosin-based resin 5 wt % (softening point: 100° C.) (molecular weight: 400) |
| Example 7 | Butyl-based rubber 50 wt % (Mn = 300,000, isoprene 1.3 mol %) | Irgacure 651 | HDDA | Rosin-based resin 5 wt % (softening point: 100° C.) (molecular weight: 2500) |

TABLE 1-continued

| | Major component | Photoinitiator | Curing Agent | Tackifier |
|---|---|---|---|---|
| Comparative Example 1 | Butyl-based rubber 15 wt % (Mn = 150,000, isoprene 1.3 mol %) | Irgacure 651 | HDDA | — |
| Comparative Example 2 | Butyl-based rubber 20 wt % (Mn = 200,000, isoprene 1.8 mol %) | Irgacure 651 | HDDA | Rosin-based resin 10 wt % (softening point: 80° C.) |

<Experimental Example> Physical Properties of Adhesive Composition

Each adhesive layer having a thickness of 50 μm was formed by curing each adhesive composition of Examples and Comparative Examples.

1) Water Vapor Transmission Rate: A water vapor transmission rate (WVTR) was measured by adding a predetermined amount of water to a cup, loading each adhesive layer thereon, capping the cup, and measuring the WVTR by Labthink TSY-T3 using a weight loss of water evaporated for 24 hours at a temperature of 38 t and relative humidity of 90%.

2) Peel Strength: Peel strength was measured by cutting each adhesive layer into a size of 1 inch×10 cm (length) and attaching the cut adhesive layer on a surface of a glass substrate by rolling a 2 kg roller back and forth five (5) times, and after 30 minutes, measuring peel strength at a peeling rate of 300 mm/min by universal testing machine (UTM).

3) Durability Test: Each film was manufactured by sequentially stacking each adhesive layer of Examples and Comparative Examples and a barrier film on an upper portion of a glass substrate. Each film was put into an autoclave and whether or not bubbles occur between the glass substrate and the adhesive layer and whether or not bubbles occur between the adhesive layer and the barrier film were confirmed at a temperature of 85° C. and relative humidity of 85% after 1 day and 3 days.

TABLE 2

| | WVTR (g/m² · 24 hr) | Peel strength (g/in) | Whether or not bubbles occur |
|---|---|---|---|
| Example 1 | 4.2 | 1000 | OK (bubbles do not occur) |
| Example 2 | 3.4 | 1100 | OK (bubbles do not occur) |
| Example 3 | 3.8 | 1200 | OK (bubbles do not occur) |
| Example 4 | 5.1 | 900 | OK (bubbles do not occur) |
| Example 5 | 5.8 | 950 | OK (bubbles do not occur) |
| Example 6 | 5.3 | 920 | OK (bubbles do not occur) |
| Example 7 | 4.9 | 890 | OK (bubbles do not occur) |
| Comparative Example 1 | 8.2 | 500 | NG (bubbles occur) |
| Comparative Example 2 | 7.0 | 800 | NG (bubbles occur) |

The adhesive compositions including the butyl-based rubber and the tackifier having a softening point of 90° C. or more were Examples 1 to 3, the adhesive composition without the tackifier was Comparative Example 1, and the adhesive composition including the tackifier having a softening point less than 90° C. was Comparative Example 2. It could be appreciated that Examples 1 to 3 had excellent water vapor transmission rate and reliability against high temperature high humidity as compared to Comparative Examples 1 and 2.

Further, it could be appreciated that even though Examples and Comparative Examples maintained peel strength over a predetermined level, Examples 1 to 3 had more excellent peel strength to provide peeling performance in which residues do not remain after each composition is used for OLED, an optoelectronic device, etc. In addition, it was confirmed that Examples 1 to 3 had excellent reliability as compared to Comparative Examples since bubbles between the adhesive composition and the glass substrate and bubbles between the adhesive composition and the barrier film did not occur in Examples 1 to 3 even in high temperature and high humidity environment.

Examples 4 and 5 in which the butyl-based rubber had a different content from that of Example 1 and Examples 6 and 7 in which the tackifier had a different molecular weight from that of Example 1 showed a slightly increased water vapor transmission rate and a slightly decreased peel strength as compared to Examples 1 to 3, but showed an excellent water vapor transmission rate and excellent peel strength and did not have bubbles as compared to Comparative Examples, such that it could be appreciated that the softening point of the tackifier had the greatest effect on durability of the adhesive composition.

The invention claimed is:

1. An adhesive composition comprising:
   a butyl-based rubber;
   a tackifier having a softening point of 90° C. or more; and
   a curing agent selected from the group consisting of an acrylate resin, a methacrylate resin, an isocyanate resin, a melamine resin, a urethane resin, an epoxy resin, an acid anhydride, a polyamine resin, and a carboxy group-containing polymer,
   wherein
   the butyl-based rubber has an amount of 50 wt % to 70 wt % relative to total weight of the adhesive composition,
   the tackifier has an amount of 5 wt % to 10 wt % relative to total weight of the adhesive composition, and
   the butyl-based rubber includes repeat units derived from isoprene having an amount of 1 mol % to 5 mol % of the total repeat unit.

2. The adhesive composition of claim 1, wherein the butyl-based rubber includes at least one selected from the group consisting of a butyl rubber, a bromo-butyl rubber, and a chlorinated butyl rubber.

3. The adhesive composition of claim 1, wherein the butyl-based rubber has a weight average molecular weight of 50,000 to 2,000,000.

4. The adhesive composition of claim 1, wherein the tackifier is a rosin-based resin, a rosin ester-based resin, a linear hydrocarbon-based resin or a cyclic olefin-based resin to which hydrogen is added.

5. The adhesive composition of claim 1, wherein the tackifier has a weight average molecular weight of 500 to 2,000.

6. The adhesive composition of claim 1, further comprising:
   at least one selected from the group consisting of a UV stabilizer, a photoinitiator, a thermal initiator, an antioxidant, a filler and a plasticizer.

7. The adhesive composition of claim 1, wherein a water vapor transmission rate (WVTR) of the adhesive composition is 10 g/m²·24 hr at a temperature of 38° C. and relative humidity of 90%.

8. The adhesive composition of claim 1, wherein the curing agent is hexane-1,6-diol diacrylate (HDDA).

* * * * *